_United States Patent Office_

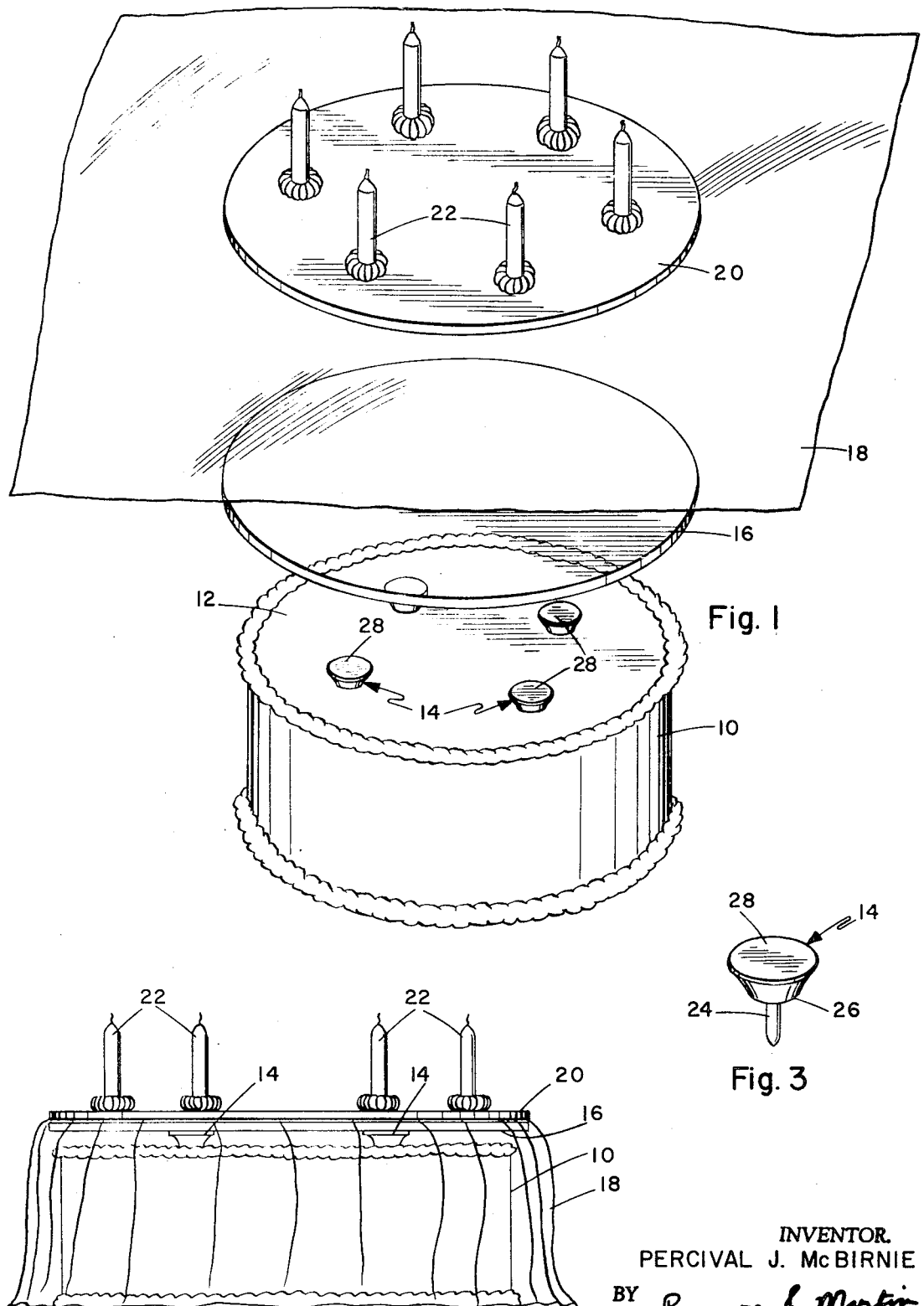

3,736,214
Patented May 29, 1973

3,736,214
CAKE COVER
Percival J. McBirnie, 530 Arbor Drive,
San Diego, Calif. 92103
Filed July 20, 1971, Ser. No. 164,253
Int. Cl. B65b 25/16
U.S. Cl. 161—18        4 Claims

ABSTRACT OF THE DISCLOSURE

A cake cover protector having a thin transparent sheet that completely covers a cake, which sheet is draped over a plate that is supported on the top of the cake and is spaced from the cake, which plate also supports candles above the transparent sheet. The cover protects the cake from being sprayed with spittle when the candles are blown out and is easily removed for cutting the cake and is entirely transparent allowing a complete view of the cake.

BACKGROUND OF THE INVENTION

It has become an accepted practice and custom to celebrate certain special occasions by having a cake with lighted candles positioned thereon. An example of such a cake and special occasion is the well known birthday cake. In such birthday occasions, the person having the birthday makes a wish and then blows out all of the candles on the cake with one blow. While this is a part of the festive occasion, it is well known that the person blowing out of the candles usually spreads spit, germs and the like over the entire surface of the cake while in the process of blowing out the candles. The candles are then removed and the cake is cut and eaten by the persons at the party, with a few of the persons giving due regard to the germs that were spread over the cake by the person blowing out the candles. This practice is unhealthy, unsavory, and contributes to the spread of germs and disease and can, to knowledgeable and understanding persons, reduce the occasion to one that is less festive.

Thus it is advantageous to have a simple and yet effective means for protecting the cake against spit, germs and the like emanating from the mouth of the person blowing out the candles, while still providing a direct view of the cake and having the candles positioned in the normal manner relative to the cake, and which cover may be quickly and easily removed to allow the cake to be cut and eaten in the normal manner.

SUMMARY OF THE INVENTION

In an embodiment of this invention, the cake cover has a transparent, flexible sheet that is draped over the cake and yet is held in a spaced position from thecake so that the sheet does not rest directly on the cake. The transparent sheet is supported in a spaced position above the upper surface of the cake by a first support means. The first support means comprises a transparent plate that extends beyond the outer circumference of the cake and thus supports the transparent sheet so that it can drape over the outer sides of the cake. A plurality of pins, having smooth upper surface of the cake by a first support means. The cake at selective locations that, for instance, will not interfere with writings or other illustrations on the upper surface of the cake. The transparent plate of the first support means is then supported on the upper surfaces of the pins and the flexible transparent sheet is draped over the first support means and over the cake. A second support means comprising a second transparent plate is positioned in alignment with the first plate and rests on the first plate with the transparent sheet sandwiched therebetween. Candles are then supported on the upper transparent plate.

The candles may then be lighted and blown out, and the plates and transparent sheet quickly and easily removed from the cake along with the pins. The cake is then sliced in the known manner. The transparent sheet and plates position the candles in a closely oriented location with the cake, to give the overall effect of the candles being directly positioned on the cake. Thus the cake is protected while preserving the aesthetic as well as the entertainment atmosphere of the entire festive occasion.

It is therefore an object of this invention to provide a new and improved cake cover for supporting candles and the like on the cake while protecting it from germs imparted from the mouth when the candles are blown out.

It is another object of this invention to provide a new and improved cake cover for supporting candles on a cake and also protecting it from germs and the like emanated from the mouth of the person blowing out the candles, which cake cover is closely spaced from the outer surface of the cake, is only supported at spaced locations on the cake surface, and which cake cover is transparent and supports candles in immediate adjacent position to the cake, making it seem that the candles are positioned on the cake.

Other objects and many advantages of this invention will become more apparent upon a reading of the following detailed description and an examination of the drawing wherein like reference numerals designate like parts throughout and in which:

FIG. 1 is an exploded perspective view of an embodiment of the invention that is to be positioned on a cake.

FIG. 2 is a side elevation view of the embodiment of FIG. 1 in the assembled position.

FIG. 3 is a perspective view of a support pin used to support the plate means on the cake.

Referring now to the drawings, in a preferred embodiment of this invention a cake 10, that may be made of any suitable cake material and may have any desired shape, is to be used for supporting candles in the known manner of celebrating a special occasion. Positioned on the cake are pins 14 at various locations on the surface 12 of the cake. The pins 14 have a flat upper surface 28 with a pin projection 24 that passes into the cake and a flat surface 26 that supports the surface 28 in a spaced position above the upper surface 12 of the cake. A transparent plate 16, rests upon the upper surface 28 of the pins 14 as illustrated in FIG. 2. A flexible sheet 18, that may be made of transparent plastic or other suitable material, rests on the plate 16 and projects out beyond the outer sides or circumferential edge of the cake 10, completely enclosing the cake and yet not contacting the cake surface. A transparent plate 20 then rests upon the plate 16 with the transparent material sandwiched therebetween, and candles are positioned on the upper support means or plate 20 in any suitable manner.

In operation, the candle support means and the protective sheet covering are positioned over the cake in the manner previously described, and the candles 22 are then illuminated. The person celebrating the birthday, wedding or the like, then blows out the candles, and any germs, spit or the like emanating from the person's mouth contacts the covering sheet 18. The covering sheet 18 is then removed by lifting plates 16 and 20 off support pins 14 and the support pins 14 are then removed from the cake 10 allowing the cake 10 to be cut in the normal manner.

The plates 16 and 20 are transparent, allowing the cake to be viewed easily through the protective cover 18. Also the pins 14 normally support plate 16 in a position closely spaced from the upper surface 12 of the cake 10, which gives a close orientation of the candles 22 with the cake 10. For round cakes, the plate 16 is circular with the plate 16 having preferably a diameter that is greater than the diameter of the cake 10, allowing the plastic sheet 18 to drape in a spaced position from the sides of the cake 10. Thus the sheet covering does not contact the cake 10 and damage the icing on the cake.

The pins 14, not being connected to the plate 16, may be selectively positioned at any locations on the upper surface 12 of the cake that will not damage or interfere with any writings, drawings, illustrations, or the like made in the icing on the upper surface of the cake 12. Also, where there are raised objects or the like on the upper surface of the cake 12, then the pins 14 may have an extended, elongated length that raises the plate 16 above the top of the objects. While the cake 10 and plate 16 are illustrated as being circular, it may be understood that they may have square configurations or other configurations as may be desired to generally conform to the configuration of selective cakes.

Having described my invention, I now claim.

1. A transparent cake cover for supporting candles and covering a cake to protect it when the candles are blown out while allowing full view of the cake comprising,
   a first transparent rigid support plate for providing a rigid flat support spaced above the upper surface of a cake,
   a flexible transparent sheet for being draped over said first support plate and completely covering the cake,
   a second transparent rigid plate for resting on said first support plate and supporting candles on the upper surface of said second plate with said sheet sandwiched between said first support plate and said second support plate,
   and pins for being placed in the upper surface of the cake at spaced locations with ends of the pins projecting above the upper surface of the cake for supporting said first support plate in said spaced position about the upper surface of the cake.

2. A cake cover as claimed in claim 1 in which, said first support plate having an outer edge that extends beyond the outer sides of the cake.

3. A cake cover as claimed in claim 2 in which, each of said pins having an enlarged head with a flat upper surface for abutting the adjacent flat surface of said first plate.

4. A cake cover as claimed in claim 3 in which, the head of each of said pins having a flat circular lower surface that abuts against and rests on the upper surface of the cake to support said first support plate.

References Cited

UNITED STATES PATENTS

| | | | |
|---|---|---|---|
| 2,206,635 | 7/1940 | Hays et al. | 206—44 |
| 1,125,855 | 1/1915 | Mapes | 312—284 |
| 1,781,752 | 11/1930 | Fisher | 161—12 |
| 764,273 | 7/1904 | Denton | 161—18 |
| 2,452,629 | 11/1948 | Bonekamp | 99—171 |
| 2,758,458 | 8/1956 | Carlson | 312—284 X |
| 2,925,173 | 2/1960 | Marcucci | 99—172 X |
| 2,085,728 | 7/1937 | Clark | 99—180 RX |
| 2,133,740 | 10/1938 | Donohoue | 108—50 X |
| 2,202,509 | 5/1940 | Addis et al. | 99—180 RX |
| 2,829,459 | 4/1958 | Halpern | 161—42 |
| 2,844,471 | 7/1958 | Boardway | 206—45.32 X |
| 3,180,739 | 4/1965 | Stoker | 99—172 |
| 3,690,902 | 9/1972 | Dahl | 99—172 |

GEORGE F. LESMES, Primary Examiner

H. F. EPSTEIN, Assistant Examiner

U.S. Cl. X.R.

99—172, 180; 108—50; 161—42; 206—45.33, Dig. No. 2; 312—284